(12) United States Patent
Hoffmann et al.

(10) Patent No.: US 8,344,098 B2
(45) Date of Patent: Jan. 1, 2013

(54) PROCESSES FOR PRODUCING POLYTRIMETHYLENE ETHER GLYCOL AND COPOLYMERS THEREOF

(75) Inventors: Christian Hoffmann, Newark, DE (US); Scott Christopher Jackson, Wilmington, DE (US); Edward R. Murphy, Wilmington, DE (US); Bhuma Rajagopalan, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 83 days.

(21) Appl. No.: 12/971,311

(22) Filed: Dec. 17, 2010

(65) Prior Publication Data

US 2011/0152498 A1    Jun. 23, 2011

Related U.S. Application Data

(60) Provisional application No. 61/288,531, filed on Dec. 21, 2009.

(51) Int. Cl.
    *C08G 65/34* (2006.01)
(52) U.S. Cl. ........ 528/425; 528/256; 528/679; 528/620; 568/623; 568/620; 568/679; 564/505
(58) Field of Classification Search .................. 528/425, 528/256, 679, 620; 568/623, 620, 679; 564/505
    See application file for complete search history.

(56) References Cited

U.S. PATENT DOCUMENTS

| | | | |
|---|---|---|---|
| 5,633,362 | A | 5/1997 | Nagarajan et al. |
| 5,659,089 | A | 8/1997 | Cai et al. |
| 5,686,276 | A | 11/1997 | Laffend et al. |
| 5,821,092 | A | 10/1998 | Nagarajan et al. |
| 6,235,948 | B1 | 5/2001 | Sunkara et al. |
| 6,538,164 | B1 | 3/2003 | Gallagher et al. |
| 6,720,459 | B2 | 4/2004 | Sunkara et al. |
| 6,977,291 | B2 | 12/2005 | Sunkara et al. |
| 7,157,607 | B1 | 1/2007 | Sunkara et al. |
| 7,161,045 | B1 | 1/2007 | Sunkara et al. |
| 7,294,746 | B2 | 11/2007 | Sunkara et al. |
| 7,388,115 | B2 | 6/2008 | Sunkara et al. |
| 2002/0007043 | A1 | 1/2002 | Sunkara et al. |
| 2002/0010374 | A1* | 1/2002 | Sunkara et al. ............... 568/619 |
| 2004/0152925 | A1 | 8/2004 | Sunkara et al. |
| 2004/0211729 | A1 | 10/2004 | Sunkara et al. |
| 2005/0272911 | A1 | 12/2005 | Okoshi et al. |

OTHER PUBLICATIONS

International Search Report, PCT International Application No. PCT/US2010/061014, Mailed Aug. 25, 2011.

* cited by examiner

*Primary Examiner* — Shane Fang

(57) ABSTRACT

Processes for producing polytrimethylene ether glycol and copolymers thereof are provided wherein, by condensing and recycling at least a portion of the vapor phase produced as the reaction progresses, the yield loss and polymer color are reduced.

17 Claims, No Drawings

PROCESSES FOR PRODUCING POLYTRIMETHYLENE ETHER GLYCOL AND COPOLYMERS THEREOF

FIELD OF THE INVENTION

The present invention relates to improved processes for producing polymeric reaction products.

BACKGROUND

As with many commercial processes, it is desirable to maximize quality and yield with minimal sacrifice to time and expense associated with production of polytrimethylene ether glycol or copolymers thereof.

Highly purified polytrimethylene ether glycol (hereinafter also referred to as "PO3G") is visually colorless, which is a desired feature for many commercial end-use applications in polyurethanes and other thermoplastic elastomers. However, the synthesis of low-colored PO3G or copolymers thereof has generally required very long reaction times or extensive pre- or post-processing resulting in additional manufacturing costs. PO3G produced from the acid catalyzed polycondensation of 1,3-propanediol (hereinafter also referred to as "PDO") is highly influenced by the quality of monomer and processing conditions, such as reaction temperature, reaction time, catalyst concentration and water concentration. Pre-polymerization treatment methods are disclosed in the prior art to remove color precursors present in the PDO (see, for example, U.S. Pat. No. 6,235,948). Attempts have also been made to reduce the color of polytrimethylene ether glycols post-polymerization. For example, Sunkara et al. disclose a process for reducing color in PO3G by contacting PO3G with an adsorbent and then separating the PO3G from the adsorbent (U.S. Pat. No. 7,294,746).

Pre- or post-polymerization methods may undesirably add additional steps, time and expense to production processes for PO3G. Attempts have also been made to alter reaction conditions to control PO3G color during polymerization. For example, U.S. Patent Application Publication No. 20050272911 discloses methods of controlling color formation by carrying out the dehydration-condensation reaction in the presence of a catalyst composed of an acid and a base. U.S. Patent Application Publication No. 20090118464 discloses methods of reducing color by maintaining the water concentration in the reaction mixture above at least about 0.08% by weight.

One way to improve yield for a polymer production process is to minimize reactant loss during polycondensation. U.S. Pat. No. 5,635,590 discloses methods of decontaminating ethylene glycol from ethylene glycol/water mixtures formed during the esterification of terephthalic acid with ethylene glycol. In this process, the contaminated ethylene glycol is subjected to preliminary distillation for separation from water and low-boiling fractions and further processing before it is resupplied to the polycondensation process as decontaminated ethylene glycol.

Thus, a need exists for improved and convenient methods to reduce color and minimize yield loss in the production of PO3G and copolymers thereof.

SUMMARY OF THE INVENTION

Provided herein is a process for producing a reaction product, comprising: (a) polymerizing reactants comprising 1,3-propanediol, oligomers of 1,3-propanediol, poly-1,3-propanediol, or a mixture thereof, in the presence of at least one polycondensation catalyst in a vessel to produce a reaction product whereby a vapor phase comprising water and reactants is produced as the polymerization proceeds; (b) condensing and collecting at least a portion of the vapor phase at a temperature sufficient to form a condensate comprising water and reactants; and (c) recycling at least a portion of the condensate to the vessel; wherein the reactant loss is less than about 5% by weight over the course of the polymerization and wherein the color of the reaction product is less than about 200 APHA units.

DETAILED DESCRIPTION

The use of acids to catalyze the polymerization of PDO can cause side reactions that yield color precursors such as allyl alcohol and other unsaturated compounds. The color precursors can react further with each other and with monomer to form compounds that impart an undesired yellowness to the polymer. As disclosed in co-pending U.S. Published Application No. 2009/0118464, the presence of a sufficient amount of water in the reaction system can prevent the formation of the color precursors and color forming compounds. However, as is known to those skilled in the art, as the amount of water in a polycondensation polymerization reaction increases, the reaction rate can be undesirably decreased. Typically, water is removed from the reaction as it is produced (see, for example, U.S. Pat. No. 6,977,291). However, in accordance with the processes disclosed herein, it has been found that recycling at least a portion of the condensate containing water and reactant back to the reaction mixture minimizes reactant loss and reduces the color of the reaction products with respect to that obtained by carrying out the reaction without recycling condensate or with water removal.

Provided herein is a process for preparing a reaction product by polymerizing reactants wherein the reactants comprise 1,3-propanediol, oligomers of 1,3-propanediol, poly-1,3-propanediol, or a mixture thereof, and, optionally a comonomer, in the presence of at least one polycondensation catalyst in a vessel, to produce the reaction product. Processes for preparing polytrimethylene ether glycol and its copolymers are known and are disclosed, for example, in U.S. Pat. No. 6,977,291 and U.S. Pat. No. 6,720,459. During the polymerization, a vapor phase comprising water is produced. For the processes disclosed herein, a portion of the vapor phase is condensed to form a liquid condensate comprising water and reactants, and the condensate is at least partially recycled to the vessel. The components of the vapor phase that are not condensed are removed as residual overheads.

Processes provided herein provide low reactant loss based on reactant charged while also producing reaction product having color less than about 200 APHA.

1,3-propanediol, oligomers of 1,3-propanediol, poly-1,3-propanediol, or a mixture or copolymer thereof; and optionally, at least one comonomer diol are polymerized in the presence of a polycondensation catalyst to form a reaction product. Polymerizing solely 1,3-propanediol, oligomers of 1,3-propanediol, poly-1,3-propanediol, or a mixture thereof in the presence of a polycondensation catalyst leads, over time, to the formation of at least one homopolymer of polytrimethylene ether glycol. When the polymerization is carried out with a copolymer of 1,3-propanediol, poly-1-3-propanediol, or a mixture thereof; or with an optional comonomer diol, the reaction product comprises at least one copolymer of polytrimethylene ether glycol.

In one embodiment, the 1,3-propanediol is prepared from petrochemical sources (hereinafter "chemically-derived 1,3-propanediol"), such as the process using acrolein. In one embodiment, the 1,3-propanediol is prepared by biochemical routes (hereinafter "biologically-derived 1,3-propanediol").

In one embodiment, the source of biologically-derived 1,3-propanediol is via a fermentation process using a renewable biological source. Biochemical routes to 1,3-propanediol have been disclosed that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. The technique is disclosed in several publications, including U.S. Pat. Nos. 5,633, 362; 5,686,276 and 5,821,092. U.S Pat. No. 5,821,092 discloses, inter alia, a process for the biological production of 1,3-propanediol from glycerol using recombinant organisms.

The preferred biologically-derived 1,3-propanediol contains carbon from the atmospheric carbon dioxide incorporated by plants, which compose the feedstock for the production of the 1,3-propanediol. In this way, the biologically-derived 1,3-propanediol contains only renewable carbon, and not fossil fuel-based or petroleum-based carbon. Polymers based thereon utilizing the biologically-derived 1,3-propanediol, therefore, has less impact on the environment as the 1,3-propanediol used does not deplete diminishing fossil fuels and, upon degradation, releases carbon back to the atmosphere for use by plants once again. Thus, the compositions can be characterized as more natural and having less environmental impact than similar compositions comprising petroleum based diols.

In one embodiment, the optional at least one comonomer diol is selected from the group consisting of 1,2-ethanediol, 2-methyl-1,3-propanediol, 2,2'-dimethyl-1,3-propanediol, 1-6-hexanediol, 1,7-heptanediol, 1,7-octanediol, 1,10-decanediol, and 1,12-dodecanediol. In one embodiment the comonomer diol is 1,2-ethanediol. The reaction mixture can comprise up to about 30%, up to about 40%, or up to about 50% of comonomer diol by weight, based on the total weight of the reaction mixture.

The polycondensation catalyst can be any known in the art for polymerizing reactants comprising 1,3-propanediol, oligomers of 1,3-propanediol, poly-1,3-propanediol, or a mixture thereof. The polycondensation catalyst is preferably an acid catalyst, and can be organic or inorganic, and can be homogeneous or heterogeneous. Suitable acid polycondensation catalysts are known in the art (see, for example, U.S. Application Publication No. 2009/0118465). Preferred acid catalysts include trifluoromethanesulfonic acid, 1,1,2,2-tetrafluoroethanesulfonic acid, and sulfuric acid.

The amount of acid catalyst used is chosen based on factors such as desired reaction rate, desired product molecular weight, catalyst cost and/or ease of catalyst removal from the reaction mixture. In some embodiments, the amount of acid catalyst fed into the reactor is from about 0.01 weight percent to about 10 weight percent based on the total weight of the reaction mixture. In one embodiment, the amount of acid catalyst fed into the reactor is from about 0.02 weight percent to about 2 weight percent. In yet another embodiment, the amount of acid catalyst is from about 0.03 weight percent to about 0.5 weight percent.

In one embodiment, the polymerization reaction is carried out at a temperature of about 120° C. to about 250° C. In another embodiment, the polymerization reaction is carried out at a temperature of about 120° C. to about 210° C. In yet another embodiment the polymerization reaction is carried out at a temperature of about 140° C. to about 190° C. In yet other embodiments, the polymerization reaction is carried out at a temperature of about 160° C. to about 190° C.

In other embodiments, the polymerization reaction is carried out with a "high-to-low" temperature profile, as disclosed in U.S. Application Publication No. 2009/0118464. The high-to-low temperature profile can be carried out by ramping the temperature down in either a step-wise manner or continuously. If carried out in a step-wise manner, the reaction can be carried out with one step change in temperature or multiple step changes. In one embodiment, the polymerization reaction is carried out using a high-to-low temperature profile at a temperature from about 120° C. to about 210° C. with the average temperature in the first part of the reaction being about 2 to about 50° C. higher than that in the second part of the reaction. In another embodiment, the polymerization reaction is carried out at a temperature from about 140 to about 190° C. with the average temperature in the first part of the reaction being about 2 to about 30° C. higher than that in the second half of the reaction. In one embodiment, the first part of the polymerization reaction is carried out at least about 180° C. and the second part of the polymerization reaction is carried out at least about 165° C. In one embodiment, the first part of the polymerization reaction is longer than half of the time for the entire polymerization reaction.

In one embodiment, the polymerization is carried out at atmospheric pressure. One of skill in the art will appreciate that the reaction vessel can be constructed from any material that is inert with respect to the reaction. For example, the vessel may be a non-corrosive metal or, preferably, glass. It is preferred that the contents of the vessel be subjected to mechanical agitation during the polymerization. One of skill in the art will appreciate that as the agitation rate is increased, more water is transferred to the vapor phase until the saturation point is reached. Preferred stir rates are about 100 to about 600 rpm, with about 350 rpm being more preferred. The reaction mixture is preferably sparged with nitrogen gas. Preferred nitrogen flow rates are about 0.05 to about 2 vessel volumes per minute, with 0.1 to about 1 vessel volumes per minute being more preferred.

The time to form the desired polymer is determined by factors such as the concentration of reactants, reaction conditions, reactor type, and operating conditions. A skilled artisan will appreciate that the rate of molecular weight build is a function of water content in the reaction mixture, and will be able to adjust the time for the reaction to achieve desired yields of a reaction product having a desired molecular weight.

For the processes disclosed herein, at least a portion of the vapor phase components produced as the polymerization proceeds is condensed. The vapor phase composition is typically influenced by evaporation, agitation rates, and nitrogen purge rates. The vapor phase components will typically comprise reactant, water, and light organics, thus the condensate will typically comprise one or more of these components. The composition of the vapor phase and therefore the condensate composition will change over time as the reaction progresses. For example, as the polymerization proceeds, less reactant is available in the vessel to evaporate.

To collect and recycle the condensate, the reaction vessel can be equipped with a commercially available condenser unit (for example, at laboratory scale, "Magnetic Control Distillation Head", Part number LG-6280-100 from Wilmad Lab Glass, Buena, N.J., USA) which can be operated such that a fraction or all of the condensate mixture can be diverted back into the vessel. Other suitable apparatus will be apparent to one of skill in the art and include apparatus known as overhead condensers, partial condensers, or rectification apparatus. "Condensate", as used herein, refers to the components of the vapor phase that are condensed in the condenser unit and collected as a liquid over the course of the polymerization. The condensate may be returned directly from the condenser to the reaction vessel or it may be accumulated offline in another vessel and charged back into the reactor. The components of the vapor phase that are not collected in the condenser unit are removed as residual overheads.

The condenser is preferably operated such that the condensate is substantially water and reactant. By "substantially water and reactants" is meant that more than about 85% by weight of the condensate is water and reactants. It is preferred that more than about 90% of the condensate is water and reactants. In some embodiments, the condensate comprises at least about 60% (by weight) of water and reactants. It is preferred that light organics are removed as residual overheads and are thus minimized in the condensate. "Light organics" refers to components in the vapor phase that have a boiling point less than that of water and comprise conjugated unsaturated carbonyl compounds that may act as precursors to color formation.

References herein to preferred compositions of condensate refer to the preferred composition of the total condensate that is returned to the reaction vessel over the course of the polymerization. At any given time during the polymerization, the amount of any given component of the condensate may deviate from preferred amounts. Such deviation is acceptable, provided the amounts recycled to the vessel over the course of the polymerization fall within preferred ranges It is preferred that the condensate comprises greater than about 50% water by weight. Even more preferred, the condensate comprises greater than about 60%, greater than about 70%, greater than about 80%, or greater than about 90% water. It is advantageous to condense as much of the reactants as possible. In some embodiments, the condensate will comprise less than about 60% of reactants, and in some embodiments, the condensate will comprise less than about 50% of reactants by weight. In one embodiment, no external water is added to the reaction mixture or vessel during the process.

The composition of the residual overheads, and the composition of the condensate can be determined using methods well known to those of skill in the art. For example, the water concentration in the condensate can be determined, by withdrawing samples and analyzing the samples by Karl Fischer titration. The amount of reactants in the condensate can be determined using gas chromatography, and the presence of light organics can be analyzed using liquid and/or gas chromatography with or without mass spectrometry.

The temperature of the condenser can be manipulated and controlled to affect the makeup of the condensate composition. "Temperature sufficient to form a condensate" as used herein means a temperature at which liquid is condensed from the vapor phase. Where the reactants comprise 1,3-propanediol, generally, light organics produced during the reaction are more volatile than 1,3-propanediol which has a normal boiling point of about 210° C. to about 212° C. "Normal boiling point" refers to the boiling point at atmospheric pressure. Operating the condenser at very low temperature, for example, at 0° C., can cause substantially all of the vapor phase to condense. However, it is desirable to fractionate the components of the vapor phase such that light organics are not condensed as they may comprise color forming species that could increase the color of the reaction product if returned to the vessel. Operation at selected temperatures allows control of the makeup of the condensate which is returned to the reaction vessel. For example, for the processes disclosed herein, a condensate comprising water and reactants is formed. It is preferred that the condenser is operated at temperatures above about 60° C. More preferred is operation at about 60° C. to about 110° C. Even more preferred are condenser temperatures of about 80° C. to about 110° C. Undesired light organics can thus be removed as part of the residual overheads while water and reactants are maintained in the condensate.

The amount of condensate returned to the reaction vessel can be controlled to affect the yield and color of the reaction product. The mass of condensate recycled to the vessel as a percentage of the total mass of condensate is referred to herein as the "reflux ratio". For high product yield it is advantageous to recycle as much reactant to the vessel as possible. Preferred reflux ratios are in the range of about 50% to about 90%. In some embodiments, the reflux ratio is greater than about 40%. In some embodiments, the reflux ratio is greater than about 50%, greater than 60%, greater than 70%, or greater than 80%.

In preferred embodiments, the reactants comprise 1,3-propanediol, and the reaction product comprises polytrimethylene ether glycol. In some embodiments, 1,3-propanediol is the only reactant. In some embodiments, the condensing is carried out at a temperature of about 60° C. to about 110° C. and about 50% to about 90% of the condensate is recycled to the vessel.

"Reactant loss" is used herein as an assessment of yield because reactant loss is a major contributor to yield loss. Reactant loss is calculated by determining the mass of unreacted starting material in the overheads that is not returned to the reactor as a fraction of the mass of reactants fed into the reaction and expressing the result as a percentage. The mass of unreacted starting material in the overheads can be determined, for example, by determining the amount of unreacted starting material in the residual overheads and adding to that the amount of unreacted starting material in the condensate that is not returned to the reaction vessel. One of skill in the art will appreciate that where the reflux ratio is less than 100%, some unreacted starting material will be lost in the condensate that is not returned to the reaction vessel. Depending on the condenser temperature, some unreacted starting material may not be condensed and thus will be lost to the residual overheads.

The processes disclosed herein allow for production of reaction product with low reactant loss and low color. In some embodiments, the reactant loss is less than about 10% by weight. In preferred embodiments, the reactant loss is less than about 5% by weight, and in more preferred embodiments, the reactant loss is less than about 3% by weight. In some embodiments, the reactant loss is less than about 2% by weight.

The molecular weight of the reaction product is typically within the range of about 500 to about 5000 g/mol. Preferably, the molecular weight is about 1000 to about 3000 g/mol. In some embodiments the product polymer has a molecular weight of about 1000 to 2250 g/mol. In some embodiments, the molecular weight of the reaction product is greater than about 500 g/mol. In other embodiments, the molecular weight of the reaction product is greater than about 1000 g/mol, and in some embodiments, the molecular weight of the reaction product is greater than about 1500 g/mol. Methods for determining molecular weight are well known to those of skill in the art and include calculation from the hydroxyl numbers obtained from proton-NMR. As another example, molecular weight may also be determined by measuring polymer viscosity and comparing it against a generated standard curve based on polymer viscosity.

APHA color values are a measure of color as defined in ASTM Standard D-1209 (2005). Preferred target color values can be selected depending on the desired molecular weight and/or the desired end use of the product. The processes disclosed herein preferably result in polymer with a color of less than about 200 APHA units, more preferably, less than about 100, and still more preferably less than about 50. The color can be less than about 40 APHA units, or less than about 30 APHA units. In certain embodiments, the color is about 30 to about 100 APHA units.

The processes disclosed herein can be used in conjunction with methods wherein the raw materials are pretreated to remove color (such as disclosed, for example, in U.S. Pat. No. 6,235,948), or methods wherein the polymer products are post-treated to remove color (such as disclosed, for example, in U.S. Pat. No. 7,294,746). In some embodiments, the processes disclosed herein can eliminate or diminish the necessity of pre- or post- treatment steps and still produce polymer of desirable APHA color.

Other post-polymerization purification procedures are known, and can be used in conjunction with the processes disclosed herein. For example, U.S. Pat. No. 7,388,115 discloses a process of removing acid esters formed from reaction of the catalyst with the hydroxyl compounds by adding water to the polymer in a hydrolysis step prior to addition of water-soluble inorganic compounds and further purification steps. U.S. Pat. Nos. 7,161,045 and 7,157,607 disclose processes for preparing polytrimethylene ether glycol wherein the phase separation after hydrolysis is promoted by addition of organic solvent.

EXAMPLES

General Materials and Methods

The 1,3-propanediol (PDO) used was Bio-PDO™ from DuPont Tate and Lyle BioProducts, LLC (Wilmington, Del., USA). Sulfuric acid was purchased from EMD Chemicals (Gibbstown, N.J., USA).

Liter is abbreviated "L"; percent by weight is abbreviated "wt %"; degrees Celsius is abbreviated "° C."; "rpm" indicates revolutions per minute; Molecular weight is abbreviated "MW".

Color Measurement and APHA Values

A Hunterlab Color Quest XE Spectrocolorimeter (Reston, Va., USA) was used to measure the polymer color. Color numbers of the polymer are measured as APHA values (Platinum-Cobalt System) according to ASTM Standard D-1209. The polymer molecular weights were calculated from their hydroxyl numbers obtained by proton-NMR. All molecular weights reported are number-average molecular weights (Mn).

General Reaction Procedure

To a 1 L kettle-type Morton glass reactor (Part number LG-8011-100 from Wilmad Lab Glass, Buena, N.J., USA) equipped with a mechanical stirrer, a dip tube and an overhead condenser unit (Part number LG-6280-100 from Wilmad Lab Glass, Buena, N.J., USA) was added 1,3-propanediol and the catalyst at the desired concentration. The overhead condenser could be operated under two modes:

a. Substantially all of the components of the vapor phase may be removed as residual overheads.

b. A fraction or all of the condensate material can be diverted back into the reactor with the help of a magnetically actuated valve.

The desired condenser temperature was maintained using a circulating bath filled with a mixture of ethylene glycol and water. The reaction mixture was sparged with nitrogen and was heated to the desired temperature using an electric heating mantle. The reaction start time was set as the time at which the reactor contents reached the desired temperature. Reaction was carried out for fixed batch times under agitation at 350 rpm and the overhead vapors were either removed or were condensed and returned back to the reactor according to the selected reflux ratio. Samples of the reaction mixture and of the condensate were collected at fixed time intervals. The reactions were terminated by allowing the reaction mixtures to cool to room temperatures.

For inventive examples, reactions were carried out as disclosed above. Once the reaction temperature was attained, a fraction of the condensate was diverted back to the reactor to achieve polymer of reduced color.

For Comparative/Control Examples the reactions were carried out as disclosed above without condensing or recycling components of the vapor phase.

"PDO lost" was calculated by determining the combined mass of starting material (PDO) in residual overheads and in the portion of condensate not diverted back to the reactor and dividing by the mass of PDO fed into the reaction. The result is expressed as a percentage.

Example 1

Sulfuric acid at 1.5 wt % of the reaction mass was used as the catalyst. The condenser was kept constant at 0° C. Two reactions were carried out. Results are summarized in Table 1. When no condensate was fed back to the reactor the color of the reaction product was 228 APHA at a molecular weight of 1132 g/mol. However, when 50% of the generated condensate was fed back to the reactor the color of the reaction product was reduced to 140 APHA at a molecular weight of 1096 g/mol.

Example 2

Sulfuric acid at 1.5 wt % of the reaction mass was used as the catalyst. The condenser was operated at 85° C. for the total duration of the reaction. When no condensate was diverted back to the reactor the color of the polymer was 124 APHA and the molecular weight was 1176 g/mol and with 50% of condensate diverted to the reactor the color was 115 APHA at a molecular weight of 1172 g/mol. With 90% of the condensate diverted into the reaction vessel the color was reduced to below 50 APHA at a molecular weight of 1214 g/mol.

Example 3

Sulfuric acid at 1.4 wt % of the reaction mass was used as the catalyst. A reaction temperature of 183° C. was used. The condenser was operated at 85° C. for the total duration of the run. When no condensate was diverted back to the reactor the color of the polymer was 544 APHA at a molecular weight of 1800 g/mol and with 90% of condensate diverted to the reactor the color was reduced to 400 APHA at a molecular weight of 1760 g/mol.

Example 4

Sulfuric acid at 1.4 wt % of the reaction mass was used as the catalyst, and a reaction temperature of 170° C. was used. The condenser was operated at 105° C. for the total duration of the run. When no condensate was diverted back to the reactor the color of the polymer was 118 APHA at molecular weight of 788 g/mol. With 90% of condensate diverted to the reactor the color was reduced to 76 APHA at molecular weight of 750 g/mol.

Example 5

Sulfuric acid at 1.5 wt % of the reaction mass was used as the catalyst, and a reaction temperature of 170° C. was used. The condenser was operated at 85° C. for the total duration of the run with 90% of condensate diverted to the reactor. Polymer with color of 29 APHA at molecular weight of 1349 g/mol was produced.

TABLE 1

Summary of data
[Reaction conditions: sulfuric acid: 1.5 wt %; stirring speed: 350 rpm; nitrogen purge flowrate: 0.5 L/min at standard conditions]

| Example | Reactor Temp (° C.) | Condenser Temp (° C.) | wt % Acid | Batch time (h) | % condensate diverted to reactor (Reflux Ratio) | MW (g/mol) | Color (APHA) | PDO lost (wt %) |
|---|---|---|---|---|---|---|---|---|
| 1 | 170 | 0 | 1.5 | 7 | 0 | 1132 | 228 | 5 |
|   |     | 0 | 1.5 | 7 | 50% | 1096 | 140 | 4 |
| 2 | 170 | 85 | 1.5 | 7 | 0 | 1176 | 124 | 5 |
|   |     | 85 | 1.5 | 7 | 50% | 1171 | 115 | 2 |
|   |     | 85 | 1.5 | 7 | 90% | 1214 | <50 | <1 |
| 3 | 183 | 85 | 1.4 | 5 | 0 | 1800 | 544 | 5 |
|   |     | 85 | 1.4 | 5 | 90% | 1760 | 400 | <1 |
| 4 | 170 | 105 | 1.5 | 7 | 0 | 788 | 118 | 5 |
|   |     | 105 | 1.5 | 7 | 50% | 750 | 76 | 3 |
| 5 | 170 | 85 | 1.5 | 9 | 90% | 1349 | 29 | <1 |

Example 6

1,1,2,2-tetrafluoroethanesulfonic acid (TFESA) at 0.25 wt % of the reaction mass was used as the catalyst. In experiment 6a, the reaction temperature was held at 183° C. for 6 hours and then reduced to 165° C. for the rest of the run. The condenser was kept at 0° C. and no condensate was diverted back into the reactor. Reaction product of color 772 APHA at a molecular weight of 776 g/mol was produced. In experiment 6b, the condenser was set at 85° C. for the first 5 hours and then lowered to 60° C. for the rest of the run and 90% the condensate was diverted back to the reactor during the entire run. The color of the reaction product was reduced to 9 APHA at a comparable molecular weight of 824 g/mol.

Example 7

1,1,2,2-tetrafluoroethanesulfonic acid (TFESA) at 0.25 wt % of the reaction mass was used as the catalyst. In experiment 7a, the reaction temperature was held at 183° C. for 6 hours and then reduced to 165° C. for the rest of the run. The condenser was kept at 0° C. and no condensate was diverted back into the reactor. Reaction product with color of 31 APHA at a molecular weight of 342 g/mol was attained. In experiment 7b the condenser was set at 85° C. for the first 5 hours and then lowered to 60° C. for the rest of the run and 90% of the condensate was diverted back to the reactor during the entire run. The color of the reaction product was reduced to 6 APHA at a comparable molecular weight of 362 g/mol.

TABLE 2

Summary of data
[Reaction conditions: 1,1,2,2-tetrafluoroethanesulfonic acid (TFESA) at 0.25 wt %; stirring: 350 rpm]

| Example | Reactor Temp (° C.) | Condenser (° C.) | Time (h) | % Condensate Diverted to Reactor (Reflux Ratio) | MW (g/mol) | Color | PDO lost (%) |
|---|---|---|---|---|---|---|---|
| 6a | 183/165 | 0 | 6 | 0 | 776 | 722 | 3 |
| 6b | 183/165 | 85/60 | 11 | 90 | 824 | 9 | <1 |
| 7a | 183/165 | 0 | 5 | 0 | 342 | 31 | 3 |
| 7b | 183/165 | 85/60 | 6 | 90 | 362 | 6 | <1 |

What is claimed is:

1. A process for producing a reaction product, comprising:
    a) polymerizing reactants comprising 1,3-propanediol, oligomers of 1,3-propanediol, poly-1,3-propanediol, or a mixture thereof, in the presence of at least one polycondensation catalyst in a vessel to produce a reaction product whereby a vapor phase comprising water and reactants is produced as the polymerization proceeds;
    b) condensing and collecting at least a portion of the vapor phase at a temperature sufficient to form a condensate comprising water and reactants; and
    c) recycling at least a portion of the condensate to the vessel; wherein the condensate comprises water and reactants, and wherein the process is characterized by a reactant loss and wherein the reactant loss is less than about 5% by weight over the course of the polymerization and wherein the reaction product has color less than about 200 APHA.

2. The process of claim 1 wherein the reactants further comprise a comonomer diol.

3. The process of claim 1 wherein the 1,3 propanediol is biologically-derived 1,3-propanediol.

4. The process of claim 1 wherein the 1,3 propanediol is chemically-derived 1,3-propanediol.

5. The process of claim 1 wherein the polycondensation catalyst is an acid.

6. The process of claim 1 wherein the polycondensation catalyst is sulfuric acid.

7. The process of claim 1 wherein the polycondensation catalyst is 1,1,2,2-tetrafluoroethanesulfonic acid or trifluoromethanesulfonic acid.

8. The process of claim 1 wherein the condensing of the vapor phase is carried out at a temperature of less than about 110° C.

9. The process of claim 8 wherein the condensing of the vapor phase is carried out for an initial time at a temperature of at least about 80° C. and at a second time at a temperature of at least about 60° C.

10. The process of claim 1 further comprising recycling about 50% to about 90% of the condensate to the reaction vessel.

11. The process of claim 1 wherein the reactant loss is less than about 3%.

12. The process of claim 1 wherein the condensate comprises at least about 50 weight percent water.

13. The process of claim 1 wherein the condensate comprises at least about 70 weight percent water.

14. The process of claim 1 wherein the reaction product comprises a homopolymer.

15. The process of claim 1 wherein the reaction product has a molecular weight of at least about 1000 g/mol.

16. The process of claim 1 wherein the color is less than about 100 APHA.

17. The process of claim 1 wherein the color is less than about 50 APHA.

* * * * *